(12) United States Patent
Sullivan et al.

(10) Patent No.: US 8,333,641 B2
(45) Date of Patent: Dec. 18, 2012

(54) WIRELESS VIDEO GAME SYSTEM AND METHOD

(76) Inventors: C. Bart Sullivan, Benicia, CA (US); Eric M. Mickelson, Benicia, CA (US)

(*) Notice: Subject to any disclaimer, the term of this patent is extended or adjusted under 35 U.S.C. 154(b) by 1151 days.

(21) Appl. No.: 11/639,074

(22) Filed: Dec. 14, 2006

(65) Prior Publication Data

US 2008/0146343 A1    Jun. 19, 2008

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. .......... 463/4; 463/10; 463/20; 463/39; 463/40; 463/41; 463/42; 463/43; 273/143

(58) Field of Classification Search .......... 463/39–43, 463/4, 10, 20; 273/143
See application file for complete search history.

(56) References Cited

U.S. PATENT DOCUMENTS

| | | | | |
|---|---|---|---|---|
| 6,009,458 | A | * | 12/1999 | Hawkins et al. ............ 709/203 |
| 6,524,189 | B1 | * | 2/2003 | Rautila ............................. 463/40 |
| 2004/0014527 | A1 | * | 1/2004 | Orr et al. ........................ 463/43 |
| 2004/0029625 | A1 | * | 2/2004 | Annunziata ...................... 463/1 |
| 2005/0192097 | A1 | * | 9/2005 | Farnham et al. ............... 463/42 |
| 2008/0280684 | A1 | * | 11/2008 | McBride et al. ............... 463/42 |

\* cited by examiner

*Primary Examiner* — David L Lewis
*Assistant Examiner* — Adetokunbo Torimiro
(74) *Attorney, Agent, or Firm* — C. Bart Sullivan

(57) ABSTRACT

A method and system for operating a multi-player wireless video-game session is disclosed. In one embodiment, a wireless device is configured to establish a wireless ad-hoc connection with another wireless device capable of serving a video game over the ad-hoc network. The wireless device is capable of communicating with the ad-hoc connection through other networks such that a video-game player in one region may move between geographic regions without loss of game play and/or may join other video games associated with other networks. In one embodiment, in response to the user joining the video game, a selection of characters along with personalities and behaviors based on attributes supplied by the user is presented to the user for selection thereof. In another embodiment, the user may transfer a selected personality to another character associated with the video game, such as a computer operated video-game character.

20 Claims, 7 Drawing Sheets ed in FIG. 1 is merely illustrative of
WIRELESS VIDEO GAME SYSTEM AND METHOD

BACKGROUND

The present invention relates in general to video games and in particular to various embodiments of playing video games with other video game players over an ad-hoc wireless network.

Playing video gaming is rapidly becoming a favorite pastime for individuals of all ages. Video games have been developed over the last few decades to include games that individuals can play with or without the interaction with others. For those games that are designed for individual play, a user may use a game consol or handheld video game device to play the video game. The user selects a particular game, and instructs the video game device to play with the user. If the user wants to play with others in a multi-user mode, typically, the other users must connect a joy-stick or some other device into the user's consol to initiate play. Unfortunately, for many users connecting to another user's consol is impractical, especially if there are more than two or three users wanting to play together.

The video-game industry has provided some solutions for multi-user video game play. For example, computer users can log onto a web-based video game and play against other users from around the world. Unfortunately, for many users playing an online video game may be inconvenient as they may not have access to the Internet, may be traveling, or for that matter, may want to play a video game with another individual but may not want to engage another player via the World-Wide Web.

In other multi-player video game configurations, the computer will often substitute computer generated and controlled characters for other players. Unfortunately, for the player the computer generated characters are often predictable and easily distinguished from the other video-game player's characters.

Recently, some video games have been developed that operate with cell phones over a BLUETOOTH network, for example, some games allow two players to play chess using a BLUETOOTH link. Unfortunately, these types of conventional video games do not work well as the interface is limited and the user must be in close proximity of the user to be used.

Therefore, what is needed is a system and method that allows a user to play video games with others either locally, or via a network such as the Internet, that is simple, cost effective, and that provides a challenging multi-character video-game environment.

BRIEF SUMMARY

Embodiments of the present invention provides for a wireless ad-hoc video game network. In one embodiment, video game players operating wireless devices such as cellular phones configured to establish ad-hoc networks may join or establish a multi-user video game session. A user may configure a video game personality based on user supplied attributes. During game play, such user defined personality may be transferred to another player or to a computer generated character to vary the game play.

In one embodiment, the present invention provides a method of playing a multi-player video game. The method includes establishing an ad-hoc wireless network between a plurality of devices capable of communicating over a wireless network, sharing a video game between members of the ad-hoc network, and providing at least one video-game character for the video game based on attributes of at least one member of the ad-hoc network.

In one embodiment, the present invention provides a method for establishing a multi-player video game. The method includes transmitting a request to join a multi-player video game, upon receiving an acknowledgement from a user to join the multi-player video game, obtaining user attributes associated with the user, and determining from the user attributes which video-game characters to present to the user.

In one embodiment, the present invention provides a system for establishing and playing a multi-user video game over a wireless network. The system includes a processor, a computer readable storage medium coupled to the processor. The computer readable storage medium includes, code for establishing a wireless ad-hoc network between a plurality of devices capable of communicating over a wireless network, code for establishing a video game over the wireless ad-hoc network, and code for providing at least one video-game character for the video game based on user attributes of at least one member of the ad-hoc network Other embodiments of the invention are described in detail below.

DETAILED DESCRIPTION OF EXEMPLARY EMBODIMENTS

Embodiments of the present invention provide for wireless multi-user video game play. In one embodiment, wireless devices are used to join an ad-hoc network used for playing a multi-user video game. The ad-hoc network may be used to wirelessly play a local multi-version video game, or may be used to join and play a multi-user video game played over a wide area network, such as the Internet. In one embodiment, a user may define a video-game character (character), and establish the personality and behavior of the video-game character by employing attributes associated with the user. Before or during video game play, a personality and behavior of a video-game character may be transferred between players, or to computer controlled video-game characters.

Figure 1:
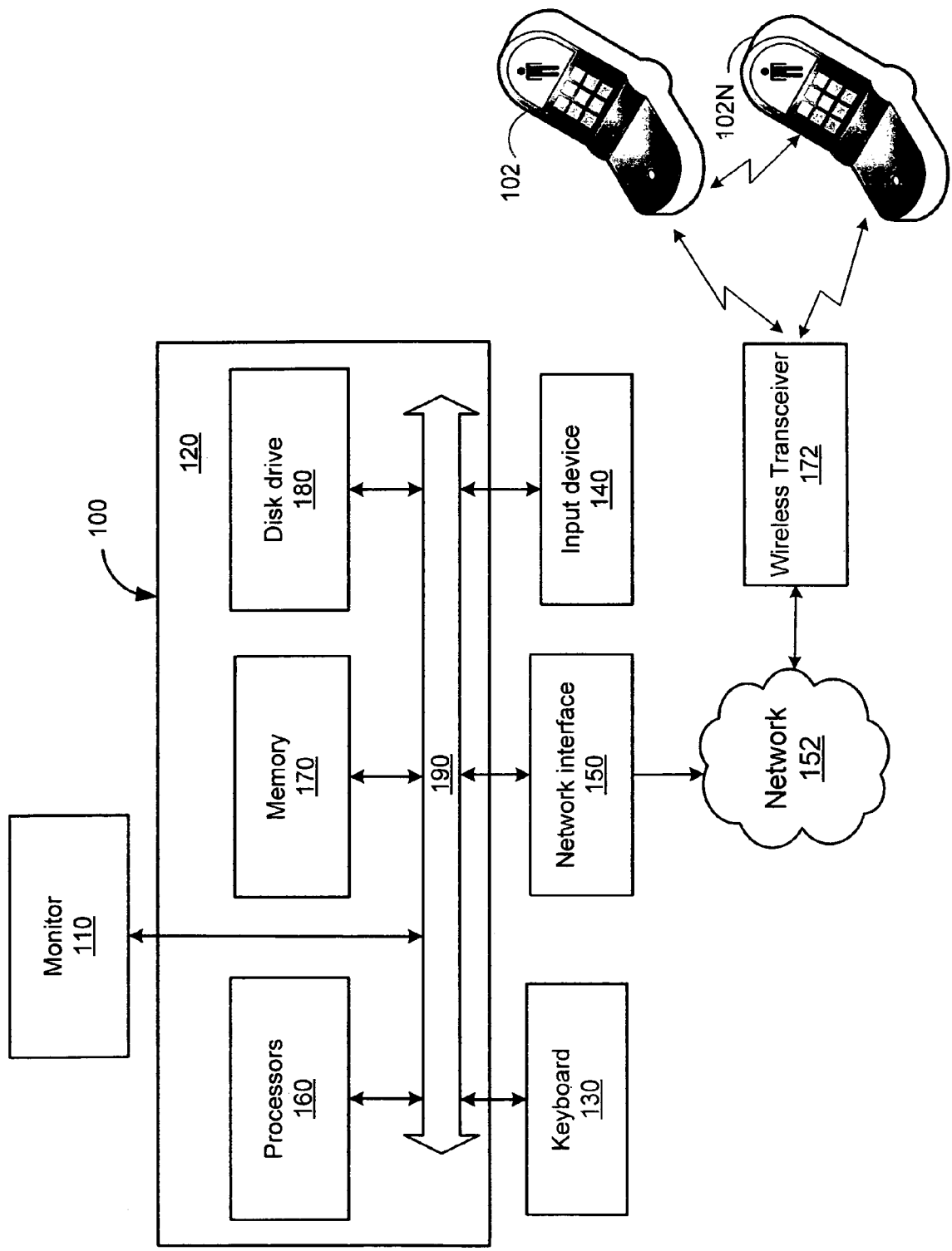
FIG. 1 is a high-level functional diagram of a multi-user video game system in accordance with embodiments of the present invention.

FIG. 1 is a block diagram of video game system 100 according to an embodiment of the present invention. Video game system 100 depicted in FIG. 1 is merely illustrative of an embodiment incorporating the present invention and is not intended to limit the scope of the invention as recited in the claims. One of ordinary skill in the art would recognize other variations, modifications, and alternatives.

In one embodiment, video game system 100 includes a display device 110 such as a monitor, computer 120, a keyboard 130, a user input device 140, a network communication interface 150, and the like. In one embodiment, user input device 140 is typically embodied as a computer mouse, a trackball, a track pad, wireless remote, and the like. User input device 140 typically allows a user to select and operate objects, icons, text, video-game characters, and the like that appear, for example, on the monitor 110.

Embodiments of network interface 150 typically include an Ethernet card, a modem (telephone, satellite, cable, ISDN), (asynchronous) digital subscriber line (DSL) unit, and the like. In other embodiments, network interface 150 may be physically integrated on the motherboard of computer 120, may be a software program, such as soft DSL, or the like.

In one embodiment, video game system 100 may also include software that enables communications over communication network 152 such as the HTTP, TCP/IP, RTP/RTSP, protocols, wireless application protocol (WAP), IEEE 802.11 protocols, and the like. In alternative embodiments of the present invention, other communications software and transfer protocols may also be used, for example IPX, UDP or the like.

Communication network 152 may include a local area network, a wide area network, a wireless network, an Intranet, the Internet, a private network, a public network, a switched network, or any other suitable communication network. Communication network 152 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 152 may communicate to one or more mobile wireless devices 102 via a base station such as wireless transceiver 172, as described herein.

Computer 120 typically includes familiar computer components such as a processor 160, and memory storage devices, such as a memory 170, e.g., random access memory (RAM), disk drives 180, and system bus 190 interconnecting the above components. In one embodiment, computer 120 is a PC compatible computer having multiple microprocessors. While a computer is shown, it will be readily apparent to one of ordinary skill in the art that many other hardware and software configurations are suitable for use with the present invention.

Memory 170 and disk drive 180 are examples of tangible media for storage of data, audio/video files, computer programs, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

Figure 2:
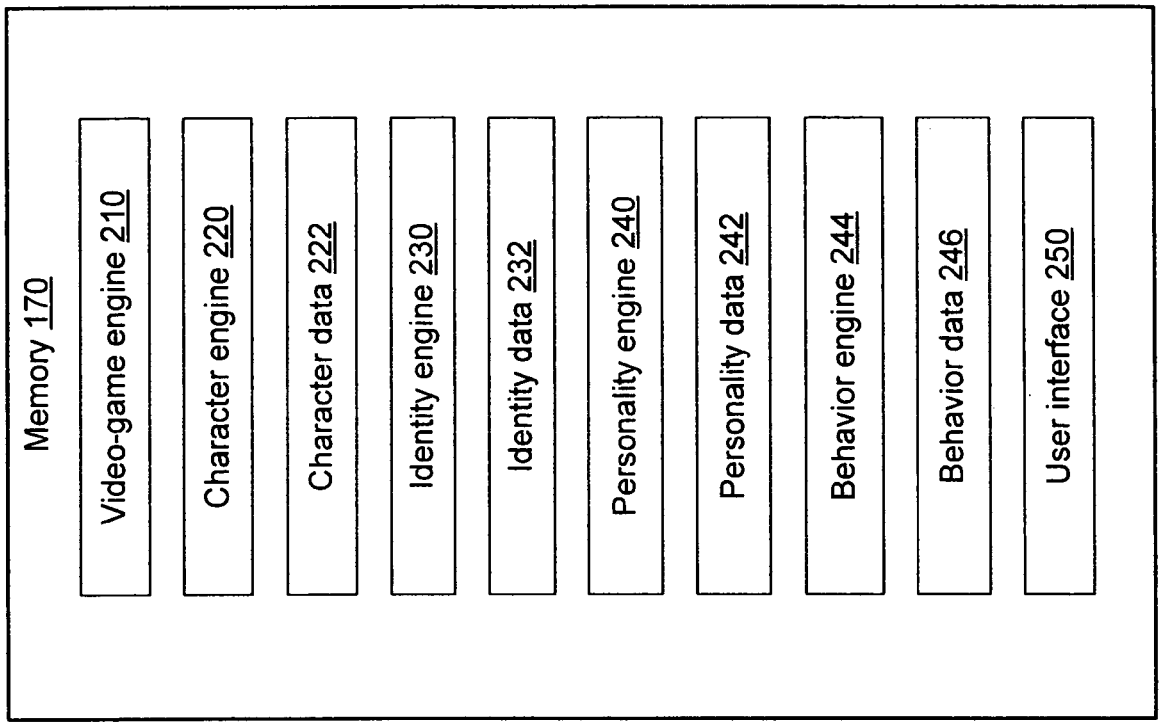
FIG. 2 is a high-level block diagram of memory in accordance with embodiments of the present invention.

FIG. 2 is a high-level illustration of memory 170 which includes a video-game engine 210, character engine 220, character data 222 for storing a plurality of video-game characters. Memory 170 may also include identity engine 230, identity data 232 which may be used to store a plurality of video-game character identities, personality engine 240, personality data 242 which may be used to store a plurality of video-game character personalities, behavior engine 244, behavior data 246 which may be used to store a plurality of video-game character behaviors, and a user interface 250. As described further below, video-game engine 210 is a software engine that facilitates establishing and operating a multi-user video game having a plurality of users (e.g., video-game players), however, embodiments of the present invention are not so limited. For example, video-game engine 210 may be used to operate or share the operation of a video game program located on computer 120, on network 152, on wireless device 102, etc.

Character engine 220 may be used to generate a video-game character based on user profiles, character data, video-game theme, and the like. In one embodiment, character engine 220 may derive or generate a video-game character type by querying any suitable data source such as character data 222, or from other sources such as a server connected to network 152. Character engine 220 may be configured to provide video-game characters to a user for selection thereof. For example, character engine 220 may be configured to display a list of video-game characters for a user over display device 110 for selection.

In one embodiment character engine 220 may provide a user with a selection of video-game characters based on the user's attributes derived from, for example, a user profile, a database of user characteristics, and the like. User attributes can be any suitable data associated with a user such as physical traits, education, profession, likes, dislikes, medical data, family data, personality, food preferences, video-game character preferences, and the like. If a user profile, for example, included attributes that indicated the user prefers strong characters, character engine 220 may query a data base of characters searching for characters that include strength as part of a character's attributes. Each of the video-game characters may also add additional characteristics that extended from the user's profile. For example, if a user profile includes attributes indicating that the user is physically strong, character engine 220 automatically adds additional strength when parts that include strength as one of the part's attributes are added to the user's video-game character. Adding two strong arms, for example, to a video game ballerina character may redefine the ballerina from a soft video-game character to a physically stronger video-game character.

In other embodiments, character engine 220 may enable a user to build and refine a video-game character from a plurality of individual video-game character parts obtained from a database of parts, or from video-game characters and parts designed by other users, etc. For humanoid video-game characters, such parts may include body types, body parts, shapes, colors, limbs, and like. For other types of video-game characters, such parts may be taken from portions of other video-game characters. For example, for a video-game car character, such parts may include parts of a car such as a bumper, engine, carburetor, hood, door, and the like. Such parts may be used to define attributes of the video-game character such as strength, speed, flight ability, and the like.

Identity engine 230 may be used to provide a video-game character with one or more identities. Such identities may be provided from any suitable source such as provided by a user, obtained for example in identity data 232, obtained from a third party, and the like. In one embodiment, identities may be provided, or sorted, using a theme of the video game. For example, if the game was a war game, identity engine 230 may provide the video game player a list of identities to choose from that relate to war type games. Some identities may be well known identities related to known video-game characters and/or cartoon characters, such as SUPERMAN, BATMAN, WONDER WOMAN, GREEN LANTERN, SPIDERMAN, and the like, or may be based on real identities such as a name of a celebrity, or based on other identities related to animals, etc. Identity engine 230 may generate identities using such techniques as random word selection, text string matching, where the generated identities have contextual meaning such as "Fierce Warrior". In one embodiment, such identities may be determined by identity engine 230 by querying a database of identities, and matching one or more user attributes to such database of identities, until a match is found.

In other embodiments, a user may define a character's personality. For example, in one embodiment, a user may be given a list of personality traits to choose from. Such personality traits may be defined as a portion of a character's personality. Illustratively, a user may choose a character's personality to be 60% good, 30% bad, and 10% cowardly. In one example, a user may be provided a pie-chart, and the like, to show what percentage of a personality trait makes up the personality. As such, identity engine 230 may use the user defined personality to find similar identities associated with other video game characters.

Identity engine 230 in embodiments of the present invention may be configured to morph identities and/or personality traits over time and/or in response to changing video game play. For example, an identity such as SUPERMAN may be morphed into another identity such as CLARK KENT. Such morphing feature may allow a video-game character to change from one video-game character to another, for example, to suit a user game strategy. In one example, a video-game character is morphed in response to an action by another video-game character or by the game environment. For example, a princess character may be morphed to a warrior character in response to an attack by another user (e.g., video-game player).

In other embodiments, identity engine 230 may be configured to create new identities by combining two or more identities and/or identity traits stored for example in identity data 232. Identity engine 230 may merge such new identities together in response to a user input. For example, a user may want a video-game character to be forty percent of one video-game character and sixty percent of another video-game character, adjustable using a user input such as a user controllable slide bar display and the like.

In one embodiment, personality engine 240 is used to generate a personality or multiple personalities for each video-game character based on user profiles, user attributes, video-game character data, video-game theme, and the like. For example, a video game may provide a user with a selection of video-game character personality traits based on the user's attributes. Such personality traits may be fixed or variable. For example, a user may select a personality and a range of moods. The moods may swing depending on the activity of the character, time, etc. During an action sequence, for example, the video-game character's mood may reflect any suitable mood such as anger, meanness, cowardice, thoughtfulness, excitement, depressed, sorrowful, joyful, and the like.

Personality engine 240 may be configured to swap, replace, or combine personality traits with other players either based on a user selection, and/or automatically. For example, when player A is playing a video game with player B and player C, personality engine 240 may swap the personalities of player B and C with respect to player A. In this illustration, player A would experience the personality switch between player B and C. For example, if player B was angry and player C was sad, personality engine 240 would make player C angry and player B sad. To make video game play additionally challenging, a first player may set personalities of the player's video-game character such that when they are swapped, the rival video-game character's player is affected for example to the advantage of the first player. Personality engine 240 may obtain personality information from a user or from any suitable source such as personality data 242.

Personality engine 240 may be configured to also replace the personality of a computer controlled video-game character with a player's video-game character and replace the personality of a player's video-game character with a computer controlled video-game character. For example, consider a player's character personality as an honest, and a computer character personality as deceitful, personality engine 240 may swap the honest personality with the deceitful personality. Therefore, such personality swapping may be used to increase a video-game's randomness of play and excitement, as each video-game player may not know which personalities have been swapped. In one case, as described further below, the user may swap video-game character personalities with other player's video-game characters, or computer controlled video-game character to achieve a particular goal of the video game. For example, if a particular goal of the game is to steal a valuable gem, a video-game character with an honest personality may be configured to temporarily assume or swap personalities with a video-game character having a thief personality, to steal the gem, and returning to the honest personality once the gem is stolen.

Figure 3:
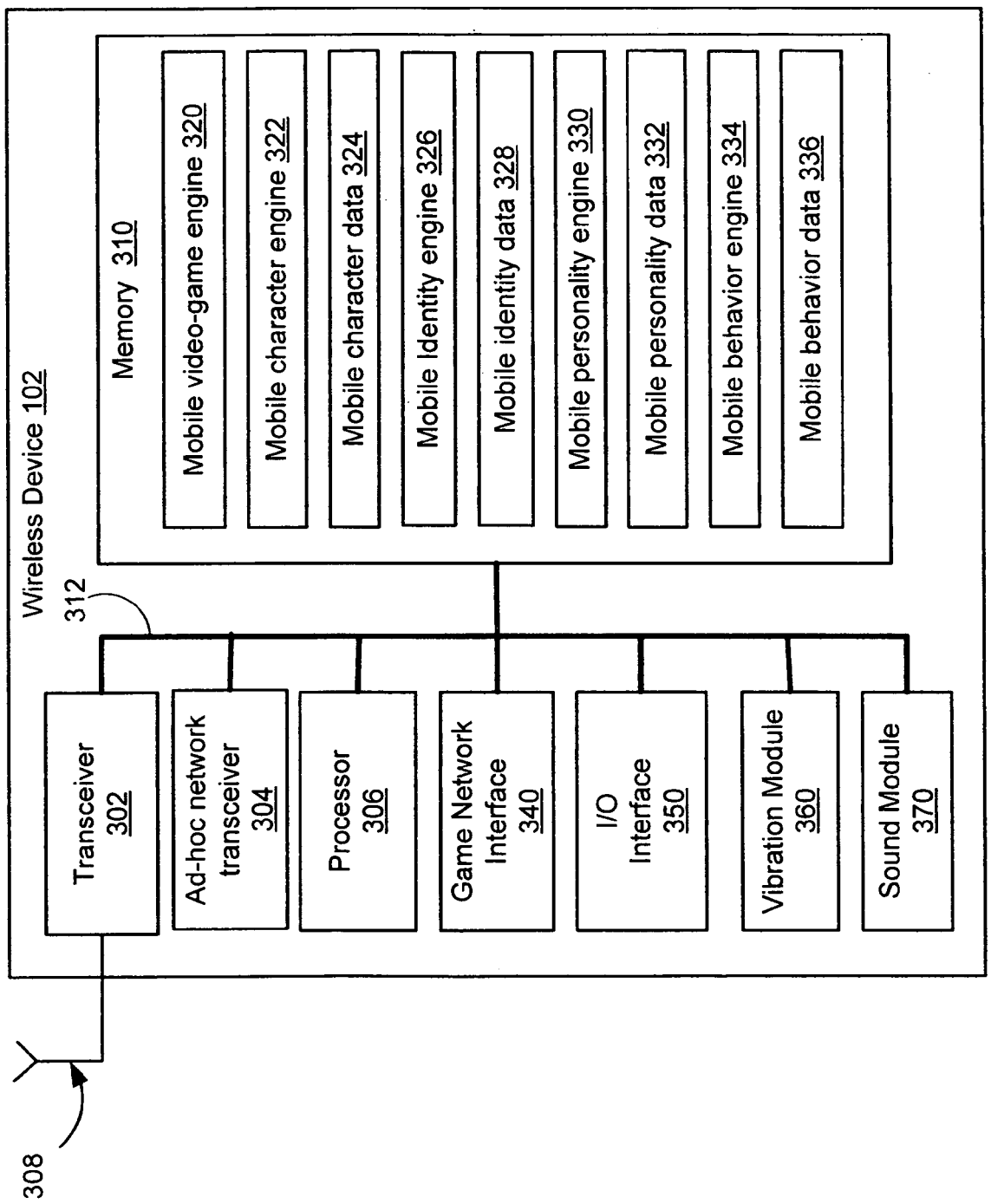
FIG. 3 is a high-level block diagram illustrating a wireless device configured to establish an ad-hoc network in accordance with embodiments of the invention.

FIG. 3 is a high-level block diagram illustrating a wireless device 102 configured to establish an ad-hoc network. In one embodiment, similar to computer 120 above, wireless device 102 is capable of creating or joining an ad-hoc network and may be capable of other types of communication such as cellular telecommunication, WIFI communication, and the like. Wireless device 102 may be configured to establish and play a multi-user video game over an ad-hoc network, and/or over a larger network such as the Internet, or an intranet. In one embodiment, wireless device 102 may be any suitable communication device such as a cellular telephone, computer, video-game consol, and the like capable of communicating with other wireless devices and networks via antenna 308. Wireless device 102 may include components such as a transceiver 302, an ad-hoc network transceiver 304, processor 306, memory 310, a game network interface 340, an input/output interface IO (e.g., keypad) 350, vibration module 360, and sound module 370. IO interface 350 may include a display, such as a display on a cellular phone, capable of displaying graphical images as known in the art.

In one embodiment, similar to computer 120 described above, memory 310 includes software capable of operating processor 306 to establish an ad-hoc network using circuitry configured to connect to a network such as transceiver 302 or ad-hoc network transceiver 304, play a video-game, generate video-game characters, create identities, create behaviors, generate one or more personalities for each of the identities, and the like, as described below. Wireless device 102 may include, for example, a mobile video game engine 320 to operate a video game program, mobile character engine 322, mobile character data 324, mobile identity engine 326, mobile identity data 328, mobile personality engine 330, mobile personality data 332, mobile behavior engine 334, mobile behavior data 336, and the like. Mobile video game engine 320 may be used to operate video game programs on wireless device 102.

Figure 4:
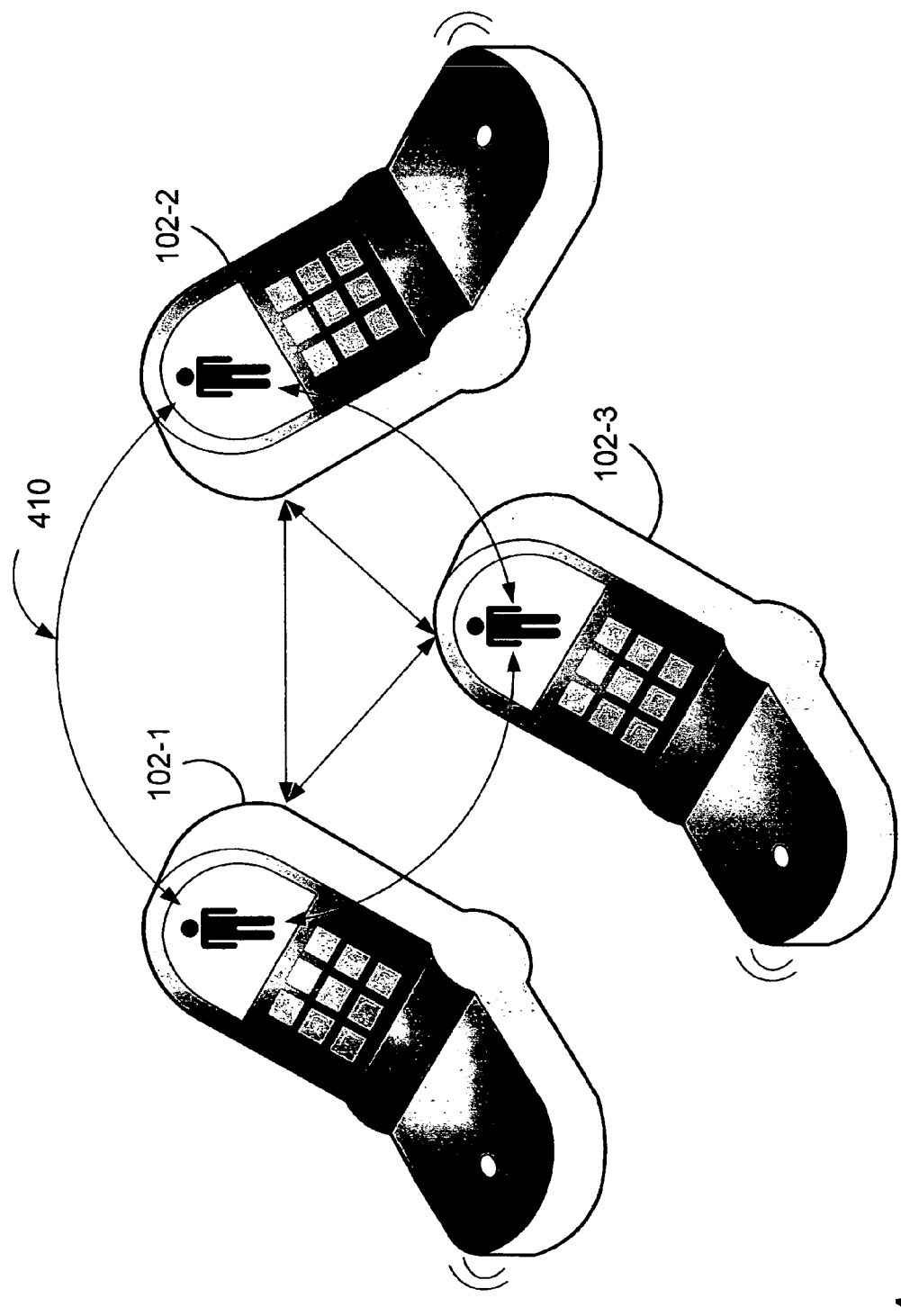
FIG. 4 is a diagram illustrating ad-hoc video game play in accordance with embodiments of the invention.

In one embodiment, similar to system 100 above, wireless device 102 may establish an ad-hoc network with other wireless devices 102. For example, as illustrated in FIG. 4, three wireless devices 102-1, 102-2, and 102-3 are connected in a wireless ad-hoc network 410, however, any suitable number of wireless devices 102 may be used to form such ad-hoc network 410. Such wireless ad-hoc network 410 may be used for example, to play a multi-user video game within the ad-hoc network 410. In an embodiment, ad-hoc network 410 may be used to connect such wireless device 102 to video games being played, for example, over the Internet or an intranet.

Figure 5:
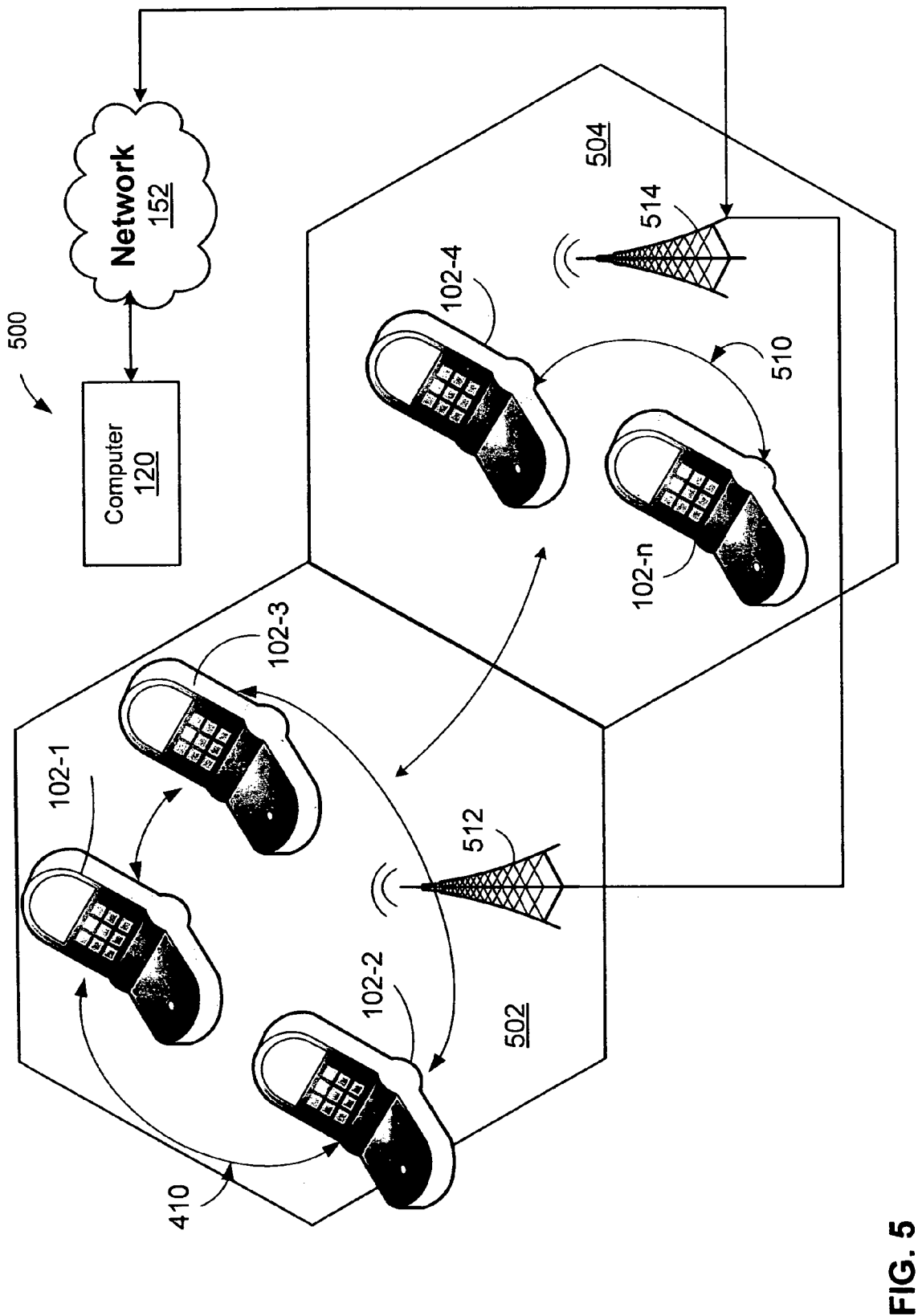
FIG. 5 is a high-level system diagram illustrating multi user video-game play in accordance with embodiments of the invention.

To establish ad-hoc network 410, a user may initiate communication with another player having another wireless device 102. In one embodiment, the user broadcasts a message using wireless device 102 within range to join a video game operating, for example, with mobile video-game engine 320. Initially, the user initiating the ad-hoc network and video game becomes the master device. Other players joining the ad-hoc network become slave devices such that the video game may be controlled by the master device. If the master device leaves the network or decides to relinquish the master device role, another player is chosen or elects to become the master device. Master device may also transfer control of ad-hoc network 410 over to a central computer, such as computer 120. For example, as illustrated in FIG. 5 described below, an ad-hoc network 510 may be controlled by computer 120 via network 152.

In one embodiment, two or more ad-hoc networks may join each other to form a larger network. For example as illustrated in FIG. 5, ad-hoc network 410 within one cell 502 may join with another ad-hoc network 510 in another cell 504. Such ad-hoc networks may be controlled by computer 120 in communication with such ad-hoc networks 410 and 510 via respective cell transmitters 512 and 514 coupled to network 152. Such centralized control enables a larger ad-hoc network to be formed from a group of smaller ad-hoc networks and/or connect to other networks such as network 152.

In other embodiments of the present invention, one or more members of the ad-hoc network 410, network 510, and other networks such as network 152, may share processing of a video-game using, for example, mobile video-game engine 320. For example, two wireless devices 102 may share processing a video game, or computer 120 may share processing a video game with a wireless device 102. Such a shared processing arrangement allows users of the video game to combine computing processing power to play video games that may require processing power greater than one wireless device 102, computer 120, etc., may be able to supply. In one embodiment, such shared processing is enabled by sharing processing between one or more video-game engines 210 and/or one or more mobile-video game engines 320.

Figure 6:
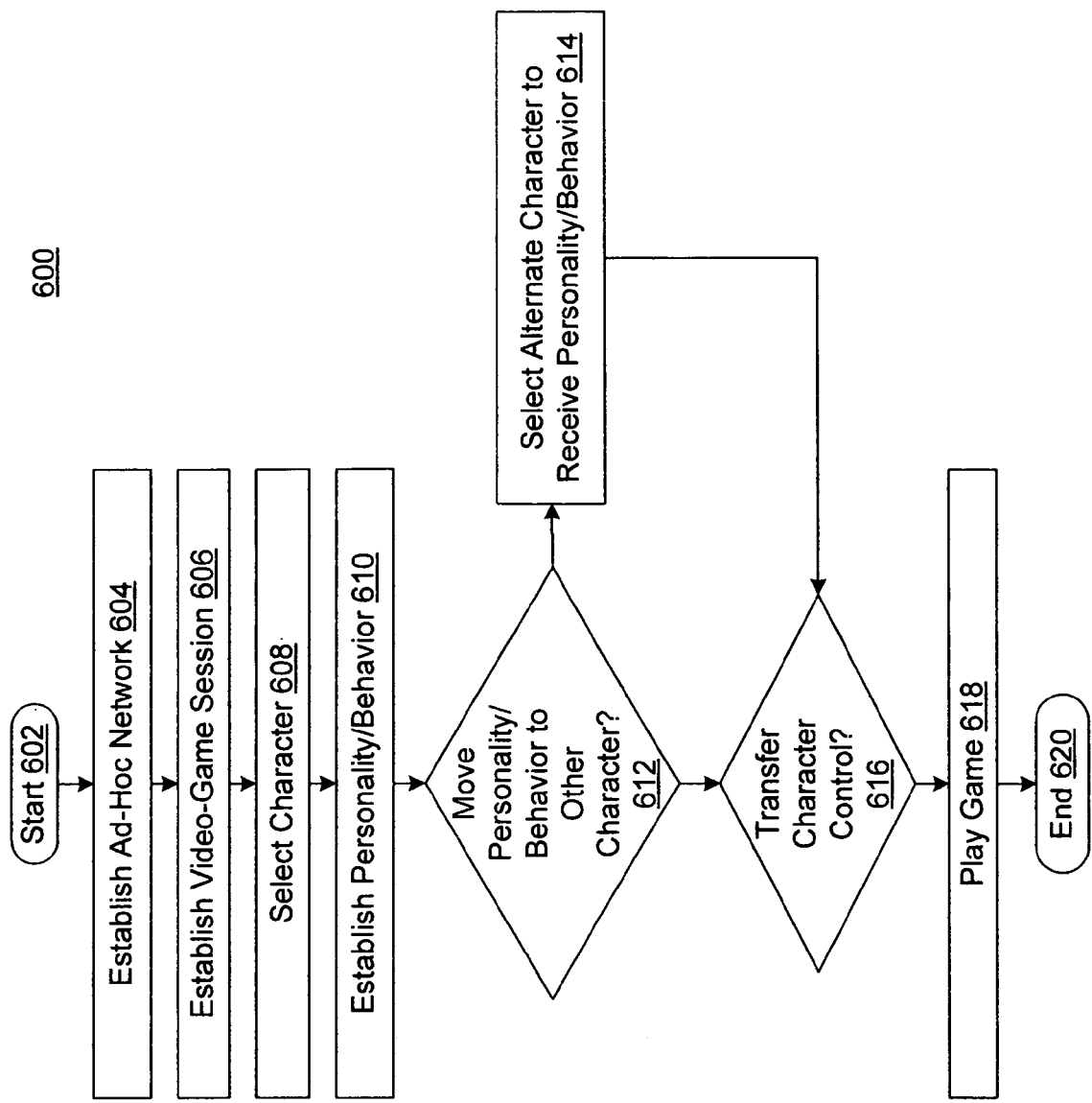
FIG. 6 is a flow diagram illustrating a method of operating a multi-user video game in accordance with embodiments of the invention.

FIG. 6 is a flow diagram illustrating a method 600 of operating a multi-user video game. Method 600 may be entered into at step 602, for example, by a user initiating an ad-hoc network between two or more wireless devices 102. At step 604, an ad-hoc network is established between two or more wireless devices 102. In one embodiment, one wireless device 102 becomes a master device. For example, a user may initiate a game with other users within the range to form an ad-hoc network. The other users may be signaled that a video game is available for play. In embodiments of the present invention, as the role of the master device may change, users may join or leave the game at any time, without necessarily affecting video game play.

At step 606, a game session may be established. A game session may include joining or starting video game play, observing video game play, and the like. For a game that is a pay-for-play type of game, a user may be asked to provide a form of payment, such as a credit card, debit card, Internet payment account, and the like, and/or a video audio account such as ITUNES, NETFLIX, GAMEFLY, etc. may be used. For example, consider the case were a game developed by a game development/distribution company is played. The master user would transmit the game for use with other game players. New users may be asked for payment and/or to sign up with the game development/distribution company for current and future game play. Those users who have accounts with the game development/distribution company may be recognized and automatically connected to the game.

In one embodiment, a game transmitter (e.g., base station) operated by, for example, the game development/distribution company, may transmit a video game within range of one or more users. Users entering the area of the transmitter may be queried to see if the users wish to join the game. In one embodiment, a user may register with the game development/distribution company for local game play just at that particular transmitter, or join a larger game network. This process allows a user to rent temporary game play without signing up for a subscription. Such a local transmitter may allow video game players to play games with other video game players locally, or connect to a larger video gaming network.

In an embodiment, such a video game transmitter may be connected to a video game kiosk and the like that allows a user to purchase game, game accessories, etc. Such a kiosk may be a solo kiosk, part of a larger kiosk network, located in a retail store, and the like. The kiosks may be mobile or fixed kiosks, and when connected to other kiosks enable a user to join games played in proximity of one kiosk or join a game being played at other kiosks.

In other embodiment, such video game transmitters may be a base station located in a retail establishment such as a hotel, restaurant, shopping mall, video store, retail store, and the like. Such retail establishments may provide for free game play or paid game play, or may let the customer play the game in exchange for coupon use. For example, if a customer uses a particular coupon provided by a retail establishment, the customer may be allowed to connect to a network located in the establishment to play video game hosted by or provided by such establishment.

At step 608, in one embodiment, a user obtains a character for the game they are joining or observing. When a user joins or establishes a game, the user may obtain their video-game character from a plurality of locations. For example, the user may obtain a video-game character from their wireless device 102, from memory 170, from a server or database linked to network 152, and the like. The video-game character may be supplied by the game or the user may provide a video-game character they have created if the game allows such a user created character. In one embodiment, a video-game character may be obtained from another user or network such as the Internet. In other embodiments, a video-game character may be built from compatible parts from other users or parts locations. Such video-game character building allows a user to gain powers and characteristics from other users and/or parts stored available for example from network 152.

In cases where a video-game character is provided by, for example, a game company that charges for video-game characters and/or parts of video-game characters, the user may elect to purchase or rent a video-game character part. Such part procurement may enable a user to purchase a predefined video-game character or build one. Such purchased or rented video-game characters and parts may allow the user to buy functions not normally available from other non-purchased/rented video-game characters.

In one embodiment, at step 610 a personality and behavior is obtained for the chosen video-game character. In some embodiments, such a personality and behavior may be derived from user characteristics input by the user or may be obtained from a third party. For example, the user may input personality and/or behavior characteristics or may obtain personality and/or behavior characteristics from a video-game supplier, video-game rental company, online-video service, and the like.

Personality may be separate from behavior in some embodiments of the invention. For example, a user may define a meek personality to behave aggressively, a courageous personality to behave cowardly, a loving personality to behave indifferent, and the like. Personalities may also be defined to change given a particular situation during game play, randomly change, or change to reflect a changing mood in a character. The level of personality change may be set by the user, game company, network, and the like. In one embodiment, the user selects the personality and the level of personality change.

Behavior may be set by a user, or set by a third party such as game developer. In some embodiments, behaviors may be set by the user to reflect custom behaviors. For example, a user may vary a cunning behavior of the video-game character to varying levels. In other embodiments, behaviors may be set to automatically adjust to a given situation or remain within a predefined behavior boundary. In the case where a behavior has been programmed to change in response to a given situation, the user may set the amount of behavior change. For example, a video-game character changes from a mild-manner behavior to an aggressive behavior when being attacked. However, if the video-game character was set to remain more calm by the user, when attacked, such a video-game character may change from a mild-mannered behavior to a more defensive behavior according to the preset range of behavior.

In one embodiment, at step 612 the personality and/or behavior of one video-game character may be moved to another video-game character. If a user desires to move the personality and/or behavior to another video-game character, at step 614, such a move may be initiated by such user to another player or to a computer controlled video-game character. In the case where one user wishes to transfer a personality and behavior of one video-game character to another player, mobile personality engine 330 may be used to transmit a request to another player. Such a request may be a popup display on IO interface 350, a text message, or other type of alert.

In the case where a user wants to move the personality of his video-game character to a computer controlled video-game character, the computer may respond to the transfer by determining if the transfer is allowed. For example, a personality and character transfer may have already been made by another user. In one embodiment, if such a new personality and behavior requires an OK by the other player, a message may be sent to the other player. The other player may allow the transfer, and/or may require payment of some form for the transfer. If a payment is required, such a payment may be in any suitable form such as currency, or in the form of a swap of parts, behaviors, personalities, and the like. At step 618, the game is played and/or continued. If the game is finished, or the user is ending their video-game session, the method 600 ends at step 620.

Figure 7:
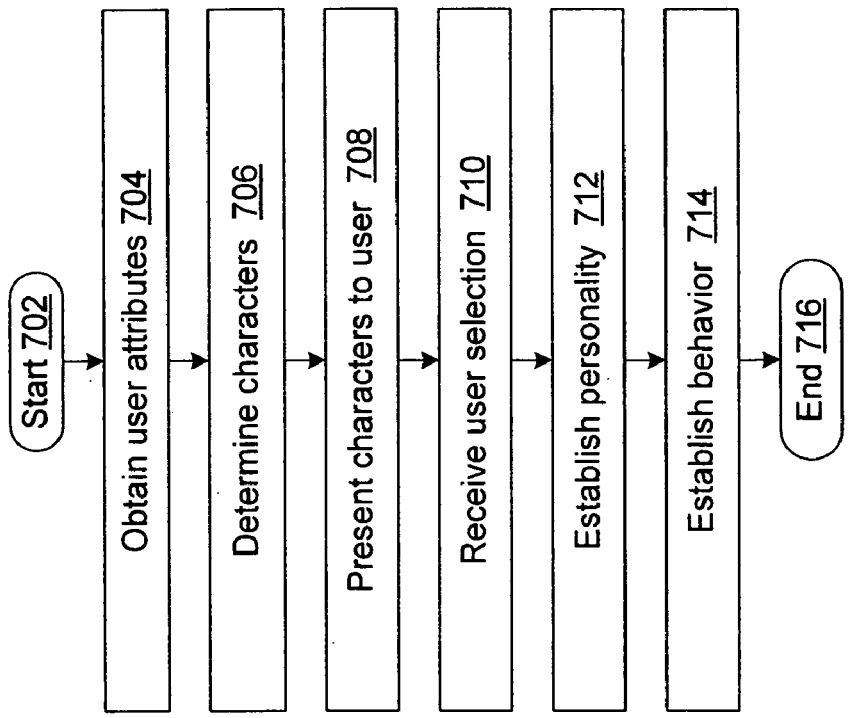
FIG. 7 is a flow diagram illustrating a method of configuring a video game character in accordance with embodiments of the invention.

FIG. 7 is a flow diagram illustrating a method 700 of configuring a video-game character. Method 700 may be entered into at step 702, for example, by a user selecting a video-game character, such as in step 608. At step 704, user attributes are obtained. For example, such user attributes may be obtained from any suitable source such as memory 170, memory 310, and the like. User attributes may also be obtained by querying a user. Such a user query may be performed on wireless device 102, computer 120, via a user interface connected to the network 152, and the like.

At step 706, method 700 searches using, for example, video-game engine 210 or mobile video-game engine 320, for one or more video-game characters to present to a user for selection. In one embodiment, video-game characters are selected based on a user's attributes. For example, if a user had input attributes such as happy, carefree, gregarious, fun-loving, and the like, method 700 searches for video-game characters that match one or more of such attributes. This allows a user to search for and select video-game characters that match a profile of attributes without having to search through video-game characters that they would not want. Such a search process may be user enabled or disabled. For example, a button or function may be provided to the user to allow the user to use attributes to help sort video-game characters, or may be used to turn off the function to allow the user to search and select from all available video-game characters. In other embodiments, an opposite video-game character search and selection process may be invoked to allow a user to select video-game characters that pose the opposite attributes. Such a process, for example, allows a user to select from "evil" video-game characters if their attributes define "good" video-game characters.

At step 708, if a match is found, video-game characters are presented to a user via, for example, IO interface 350, monitor 110, and the like, otherwise default video-game characters may be provided. In one embodiment, at step 710 a user may select more than one character where one character morphs into another character. For example, the user may select CLARK KENT and SUPERMAN characters that allow the user to morph between CLARK KENT and SUPERMAN as desired. In other embodiments, such character selection may include selecting which computer controlled characters may be swapped with the user's character.

In one embodiment, at step 712, the personality of each character selected by the user is obtained. In one example, a user may obtain one or more personalities to apply to the characters selected using personalities stored in memory 170, personality data 332, and the like. For example, the user may select a personality from a list of stored personalities. Once selected, the user applies the personality to the characters selected. In an embodiment, the user may modify the personality data obtained. Such a real-time (e.g., on-the-fly) modification allows the user to adjust a personality to a particular game situation. For example, for a battle game, the user may select a warrior personality, and then adjust the warrior personality to have more or less aggression in battle. Such adjustment capability, allows the user to define and/or refine the video-game character to the given game.

At step 714, behaviors are obtained for one or more characters. In one example, a user may obtain one or more behaviors to apply to the video-game characters selected using behaviors stored in memory 170, memory 310, and the like. For example, the user may select behaviors from a list of stored behaviors. Once selected, the user applies the behaviors to the selected video-game characters. In an embodiment, the user may modify the behavior data. Such a real-time modification allows the user to adjust a behavior to a particular game situation. For example, for a quest game, the user may select a wizard personality, and then adjust the wizard behavior to be more enlightened. Such adjustment capability, allows the user to refine and/or define the video-game character to the given game. At step 716, method 700 ends.

Embodiments of the invention provide a number of advantages. Such advantages include the ability to establish an ad-hoc network with others on-the-fly in a wireless environment, without the need to operate a game consol. Other advantages allow the user to define a video-game character's personality and behavior, or to define a video-game character based on the user's attributes, to allow a user to create a customized video-game character. As explained above, embodiments of the invention provide for users to join video-games operating on other networks from a mobile communication device such as a cellular phone without having to play the video game via a video-game access terminal. Embodiments of the invention also provide the advantage of being able to transfer a video-game character identity, or personality, or behavior associated with one player to another player or to a computer operated video-game character thereby providing more video game variability and excitement.

Further aspects of embodiments of the invention are illustrated in the attached figures. Additional embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of playing a multi-player video game, the method comprising:
    establishing an ad-hoc wireless network between a plurality of devices capable of communicating over a wireless network;
    sharing a video game between members of the ad-hoc network;
    determining from one or more attributes associated with a user of the multi-player video game, a characteristic of the user;
    searching the network for user-operated video-game characters having at least one character characteristic that matches the characteristic of the user;
    presenting a list of user-operated video-game characters to the user, wherein the list includes user-operated video-game characters having the character characteristic which matches the characteristic of the user;
    receiving a selection of a user-operated video-game character from the list of user-operated video-game characters presented to the user;
    configuring the selected user-operated video-game character with an additional characteristic derived from the one or more attributes of the user, wherein the additional characteristic varies over time or varies in response to video-game play;
    presenting a list of computer-operated video-game characters that are independently operated by a processor generating the video game for the user, and are therefore configured to operate independent of user control;
    receiving, from the user, a selection of a computer-operated video-game character from the list of the computer-operated video-game characters;
    transferring at least some of the additional characteristic to the selected computer-operated video-game character; and
    transferring at least some characteristics between the computer-operated video-game character and the user-operated video-game character, wherein the transfer of characteristics between the user-operated video-game character and the computer-operated video-game character changes a personality and a behavior of the user-operated video-game character, and a personality and a behavior of the computer-operated video-game character with respect to the characteristics and the additional characteristic transferred, thereby allowing the user-operated video-game character to assume at least some of the behavior and the personality of the computer-operated video-game character and the computer-operated video-game character to assume at least some of the behavior and personality of the user-operated video-game character.

2. The method of claim 1, wherein the plurality of devices comprise at least one mobile device.

3. The method of claim 1, wherein the ad-hoc wireless network is formed between a network interface of a first mobile device and a network interface of at least one other mobile device.

4. The method of claim 1, wherein the ad-hoc wireless network is formed between a first mobile device and a base station broadcasting the video game.

5. The method of claim 1, wherein the additional characteristic comprises a personality trait of the user derived from the user attributes.

6. The method of claim 5, further comprising transferring a portion of the user-operated video-game character containing the personality trait to the computer-operated video-game character in order to modify a personality, or modify a behavior, or modify an identity of the computer-operated video-game character associated with the video game.

7. The method of claim 6, wherein transferring the portion comprises replacing a part of the user-operated video-game character with a part of the computer-operated character containing at least some of the personality trait in order to transfer at least some of the characteristics between the user-operated video-game character and the computer-operated video-game character.

8. The method of claim 1, further comprising determining a ratio for transferring the characteristics and the additional characteristic between the user-operated video-game character and the computer-operated video-game character; and
    transferring the characteristics and the additional characteristic between the user-operated video-game character and the computer-operated video-game character according to the ratio.

9. A method for establishing a multi-player video game, the method comprising:
- transmitting a request to join a multi-player video game;
- upon receiving an acknowledgement from a user to join the multi-player video game, obtaining, with one or more processors associated with one or more computer systems, user attributes associated with the user, wherein the user attributes include at least some data pertaining to user's characteristics of the user's person or behavior;
- querying a database with the one or more processors associated with one or more computer systems for user-operated video-game characters having at least one character characteristic matching at least one of the user's characteristics;
- determining, with the one or more processors associated with the one or more computer systems, from at least one of the user's characteristics a list of user-operated video-game characters to present to the user;
- receiving, with the one or more processors associated with the one or more computer systems, a selection of a user-operated video-game character from the list of user-operated video-game characters presented to the user;
- configuring, with the one or more processors associated with the one or more computer systems, the selected user-operated video-game character with an additional characteristic derived from the one or more attributes of the user, wherein the additional characteristic varies over time or varies in response to video-game play;
- presenting, with the one or more processors associated with the one or more computer systems, a list of computer-operated video-game characters that are independently operated by a processor generating the video game for the user, and are therefore configured to operate independent of user control;
- receiving, from the user, with the one or more processors associated with the one or more computer systems, a selection of a computer-operated video-game character from the list of the computer-operated video-game characters;
- transferring, with the one or more processors associated with the one or more computer systems, at least some of the additional characteristics to the selected computer-operated video-game character; and
- transferring, with the one or more processors associated with the one or more computer systems, at least some characteristics between the computer-operated video-game character to the user-operated video-game character, wherein the transfer of characteristics between the user-operated video-game character and the computer-operated video-game character changes a personality and a behavior of the user-operated video-game character, and a personality and a behavior of the computer-operated video-game character with respect to the characteristics and the additional characteristic transferred, thereby allowing the user-operated video-game character to assume at least some of the behavior and the personality of the computer-operated video-game character and the computer-operated video-game character to assume at least some of the behavior and personality of the user-operated video-game character.

10. The method of claim 9, wherein determining which user-operated video-game characters to present to the user comprises providing, with the one or more processors associated with the one or more computer systems, at least one user-operated video-game character that includes at least one character trait associated with the user's characteristics.

11. The method of claim 9, further comprising determining, with the one or more processors associated with the one or more computer systems, from at least one of the user's characteristics which user-operated video-game character personalities to present to the user.

12. The method of claim 11, wherein determining which personalities to present to the user comprises providing, with the one or more processors associated with the one or more computer systems, at least one user-operated video-game character personality that includes at least one personality trait associated with the user's characteristics.

13. The method of claim 11, further comprising determining, with the one or more processors associated with the one or more computer systems, from the user's characteristics which character behaviors to present to the user.

14. The method of claim 13, wherein determining which behaviors to present to the user comprises providing, with the one or more processors associated with the one or more computer systems, at least one user-operated video-game character behavior that includes at least one behavior associated with the user's characteristics.

15. A system for establishing and playing a multi-user video game over a wireless network, the system comprising:
- a processor:
- a tangible computer readable storage medium coupled to the processor, wherein the computer readable storage medium includes:
- code for establishing a wireless ad-hoc network between a plurality of devices capable of communicating over a wireless network;
- code for establishing a video game over the wireless ad-hoc network;
- code for determining from one or more attributes associated with a user of the multi-player video game, a characteristic of the user;
- code for searching the network for user-operated video-game characters having at least one character characteristic that matches the characteristic of the user;
- code for presenting a list of user-operated video-game characters to the user, wherein the list includes user-operated video-game characters having the character characteristic which matches the characteristic of the user;
- code for receiving a selection of a user-operated video-game character from the list of user-operated video-game characters presented to the user; and
- code for configuring the selected user-operated video-game character with an additional characteristic derived from the one or more attributes of the user, wherein the additional characteristic varies over time or varies in response to video-game play;
- code for presenting a list of computer-operated video-game characters that are independently operated by a processor generating the game to the user, and are therefore configured to operate independent of user control;
- code for receiving, from the user, a selection of a computer-operated video-game character from the list of the computer-operated video-game characters;
- code for transferring at least some of the additional characteristic to the selected computer-operated video-game character;
- code for transferring at least some characteristics between the computer-operated video-game character to the user-operated video-game character wherein the transfer of characteristics between the user-operated video-game character and the computer-operated video-game character changes the personality and behavior of the user-operated video-game character and the computer-operated video-game character with respect to the characteristics and the additional characteristic transferred, thereby allowing the user-operated video-game character to assume at least some of the behavior and personality of the computer-operated video-game character and the computer-operated video-game character to assume at least some of the behavior and personality of the user-operated video-game character.

16. The system of claim 15, wherein code for establishing a video game over the wireless ad-hoc network comprises code for code for joining another video game associated with another ad-hoc network.

17. The system of claim 15, wherein code for establishing the wireless ad-hoc network comprises code for joining another video game hosted on a second network capable of communicating with the wireless ad-hoc network.

18. The system of claim 17, wherein the second network comprises a cellular network or a wireless intranet.

19. The system of claim 15, further comprising code for merging an identity of the of the computer-operated video game character with an identify of the user-operated video-game character to form a merged identity for the user-operated computer video-game character.

20. The system of claim 15, further comprising code for merging an identity of the of the user-operated video game character with an identity of the computer-operated video-game character to form a merged identity for the computer-operated computer video-game character.

* * * * *